(12) United States Patent
Nuebling et al.

(10) Patent No.: US 7,872,433 B2
(45) Date of Patent: Jan. 18, 2011

(54) BRIDGE DRIVER CIRCUIT WITH INTEGRATED CHARGE PUMP

(75) Inventors: Marcus Nuebling, Olching-Esting (DE); Markus Winkler, Munich (DE)

(73) Assignee: Infineon Technologies AG, Neubiberg (DE)

( * ) Notice: Subject to any disclaimer, the term of this patent is extended or adjusted under 35 U.S.C. 154(b) by 244 days.

(21) Appl. No.: 11/736,301

(22) Filed: Apr. 17, 2007

(65) Prior Publication Data

US 2007/0279107 A1 Dec. 6, 2007

(30) Foreign Application Priority Data

Apr. 19, 2006 (DE) .................... 10 2006 018 149

(51) Int. Cl.
*H02P 6/14* (2006.01)
(52) U.S. Cl. .................. 318/400.26; 388/907.2; 363/56.02
(58) Field of Classification Search ............ 318/400.26, 318/400.27, 400.29; 388/907.2; 363/132, 363/56.02
See application file for complete search history.

(56) References Cited

U.S. PATENT DOCUMENTS

| 4,926,354 | A | * | 5/1990 | Pattantyus | ................... 363/98 |
| 5,600,216 | A | * | 2/1997 | Karwath et al. | ............ 318/291 |
| 5,857,787 | A | * | 1/1999 | Ryan | .......................... 400/322 |
| 5,859,519 | A | * | 1/1999 | Archer | ....................... 318/801 |
| 6,185,118 | B1 | * | 2/2001 | Sander et al. | ............... 363/132 |
| 6,222,751 | B1 | * | 4/2001 | Portaluri et al. | ............ 363/132 |
| 6,794,835 | B2 | | 9/2004 | Kuehner et al. | |
| 6,997,684 | B2 | | 2/2006 | Hahn et al. | |
| 2001/0048278 | A1 | * | 12/2001 | Young et al. | ................. 318/254 |

FOREIGN PATENT DOCUMENTS

DE  19927903 A1  12/2000

* cited by examiner

*Primary Examiner*—Rina I Duda
(74) *Attorney, Agent, or Firm*—Dicke, Billig & Czaja, PLLC

(57) ABSTRACT

Bridge driver circuit with integrated charge pump is disclosed. One embodiment provides a driving circuit section of a charge pump capacitor being formed with power switch components and/or diodes of a bridge circuit section.

17 Claims, 3 Drawing Sheets

PRIOR ART

BRIDGE DRIVER CIRCUIT WITH INTEGRATED CHARGE PUMP

CROSS REFERENCE TO RELATED APPLICATION

This Utility Patent Application claims the benefit of the filing date of German Application No. 10 2006 018 149.2, filed Apr. 19, 2006, which is herein incorporated by reference.

BACKGROUND

The invention relates to a bridge driver circuit with integrated charge pump.

Such driver circuits of the bridge type are used in controllers of electric motors or generators and can also be used for controlling solenoid valves or in similar electromotive or electromagnetic drives.

Bridge circuits with several power components are typically used for control tasks, in which the direction of the charging current should be reversible, for example, for controlling a DC motor, which is to run selectively counterclockwise or clockwise. Because semiconductor power components are pure on-off switches, that is, they have no selective switching characteristics, their arrangement in a bridge circuit offers the possibility of realizing a circuit arrangement with selective-switching characteristics.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is illustrated by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
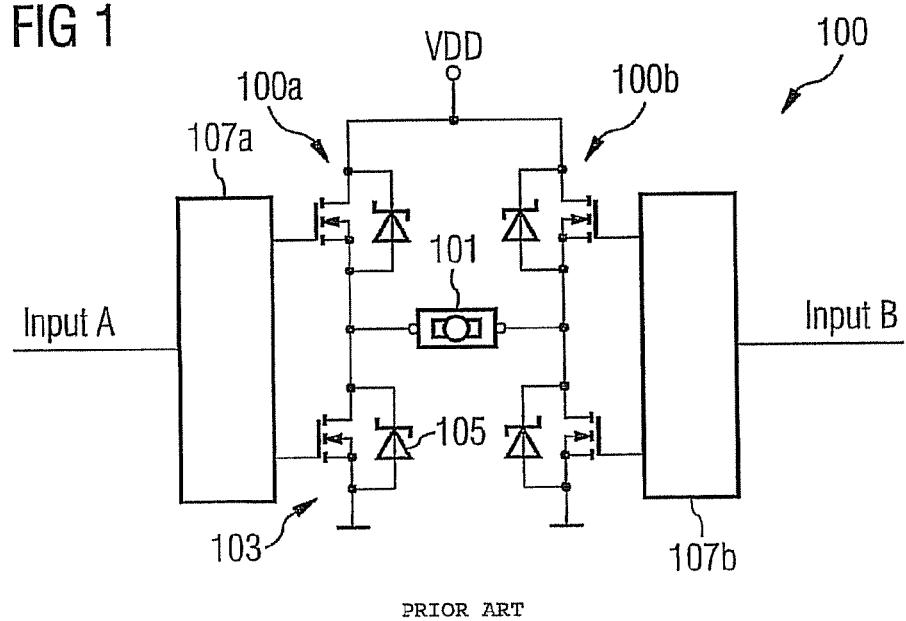
FIG. 1 a basic circuit diagram of a bridge driver circuit with semiconductor power switch elements according to the state of the art, FIG. 2 a basic circuit diagram of a bridge driver circuit of the bootstrap type according to the state of the art, FIG. 3 the basic circuit diagram of a bridge driver circuit with integrated charge pump, FIG. 4 the basic circuit diagram of a bridge driver circuit according to the invention of the H-bridge type, and FIG. 5 the basic circuit diagram of a three-phase bridge driver circuit according to the invention.

FIG. 1 illustrates the basic construction of a bridge circuit 100 as a driver circuit of a DC motor 101, which has four equivalent power transistors 103 each with a Z-diode 105 connected in parallel and arranged in two bridge branches 100a and 100b, to which drivers 107a and 107b, respectively, are assigned.

Bridge circuits as driver circuits with the mentioned applications are commercially available as self-contained integrated circuits, but there are also integrated power circuits that contain bridge branches (half-bridges) or combinations of semiconductor power components suitable for constructing bridges.

A significant operating parameter of driver circuits of the bridge type (also designated, for short, "bridge drivers" below) is the pulse duty ratio or the duty cycle. The adjustability of the duty cycle in a range from 0 to nearly 100% in an arbitrary half-bridge is desirable.

Figure 2:
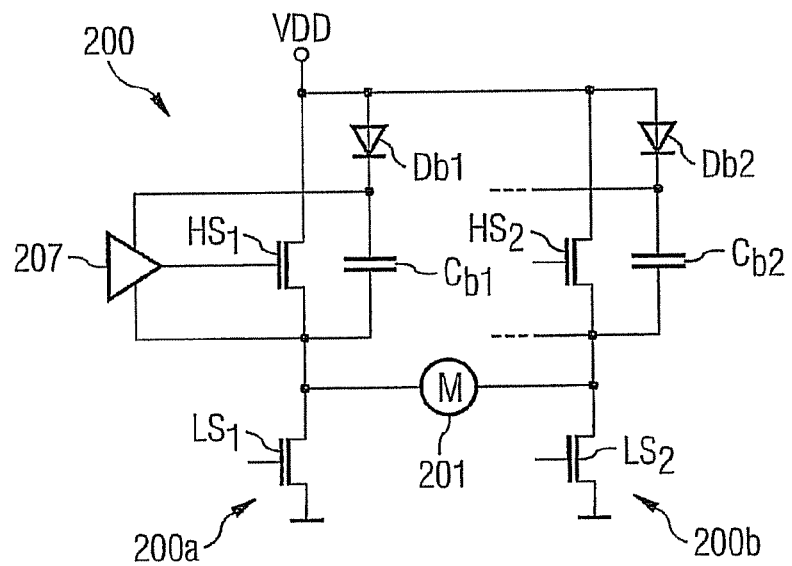

FIG. 2 illustrates a bridge driver 200 of the bootstrap type, with which a duty cycle in the range between 0 and 95% can be achieved. As is to be taken from the figure, this bridge also has, for driving a motor 201, four power components HS1, LS1 in a first bridge branch 200a and HS2, LS2 in a second bridge branch 200b, respectively, and for each of the power components a driver module 207 (of which here and also in the other figures only a single or one part is illustrated). A characteristic is the assignment of each capacitor Cb1 and Cb2 in series with a bootstrap diode Db1 and Db2, respectively, in a parallel arrangement to the high-side power switch elements HS1 and HS2, respectively, of the bridge branches.

The fact that here the duty cycle does not extend to 100% is associated with the unavoidable quiescent current of this bridge arrangement, which incidentally results in self-discharging of the capacitors Cb1 and Cb2.

The ideal adjustment range of the duty cycle up to 100% can be realized with bridge drivers, which have an integrated charge pump. Such a bridge circuit is sketched in FIG. 3. In this figure, identical or functionally corresponding components as in FIGS. 1 and 2 are designated by corresponding reference symbols and will not be described again.

Instead of the series arrangement provided in the bootstrap bridge driver according to FIG. 2 made from a bootstrap diode and capacitor with discharge characteristics, each in assignment to a bridge branch, here a charge pump section 310 is provided, whose function and construction are known to someone skilled in the art and which therefore does not require a more detailed explanation. The charge pump section constantly provides a high voltage for the actual bridge section, whereby a duty cycle of 100% can be achieved.

The charge pump section 310 essentially comprises an oscillator 311, which drives two charge pump switch elements 313a, 313b that are connected in series between the power-supply voltage and ground and a series arrangement made from two diodes Dc1, Dc2 connected between the bridge driver 307 and a node K1 between two bridge branches and the power-supply voltage. Finally, the charge pump 310 naturally includes a charge pump capacitor Cc lying between a node K2 between these diodes on one side and a node K3 between the charge pump switch elements on the other side.

This known bridge driver circuit, which is also used in practice, functions without failure, but the charge pump arrangement has considerable space requirements on the chip in the IC configuration and therefore this bridge driver type is relatively expensive.

One embodiment is based on the problem of providing a bridge driver especially improved in terms of cost, with which a duty cycle in the range between zero and 100% can be achieved.

One embodiment includes multiple uses of the component structures with considerable surface-area requirements on the one hand as bridge components (in the narrower sense) and on the other hand as driver components of the charge pump capacitor. It furthermore includes the idea of using, in this sense, power switch components and/or diodes of the bridge circuit section simultaneously as components of a driver circuit section of the charge pump capacitor. With suitable wiring of these components, the parallel provision of basically structurally and functionally identical active components on the chip for fulfilling the different tasks of the formation of the bridge circuit and the driving of the charge pump capacitor is avoided.

Especially in a configuration of the bridge driver circuit as an integrated circuit, a considerable amount of chip surface area for the stated components is saved, and in this way the costs are reduced. A reduction in the total component complexity and consequently a reduction in cost is achieved in this way basically also for a non-integrated configuration or, in any case, for a configuration not integrated on a single chip.

In one embodiment, the charge pump capacitor is formed in a distributed arrangement in bridge branches of the bridge circuit section. Through this distributed arrangement, the surface area economy of the driver circuit in an integrated configuration can be improved and a further reduction in cost can be achieved.

In another construction of this configuration, a first motor driver circuit, which is significant in practice, is distinguished by the construction as an H-bridge driver circuit with two charge pump capacitors and two power transistors assigned to these in driver output stages and diodes of the bridge circuit section. Another important driver circuit—especially for a three phase-current motor—is constructed as a three-phase bridge driver circuit with three charge pump capacitors and power transistors assigned to these as driver output stages and diodes of the bridge circuit section.

Figure 3:
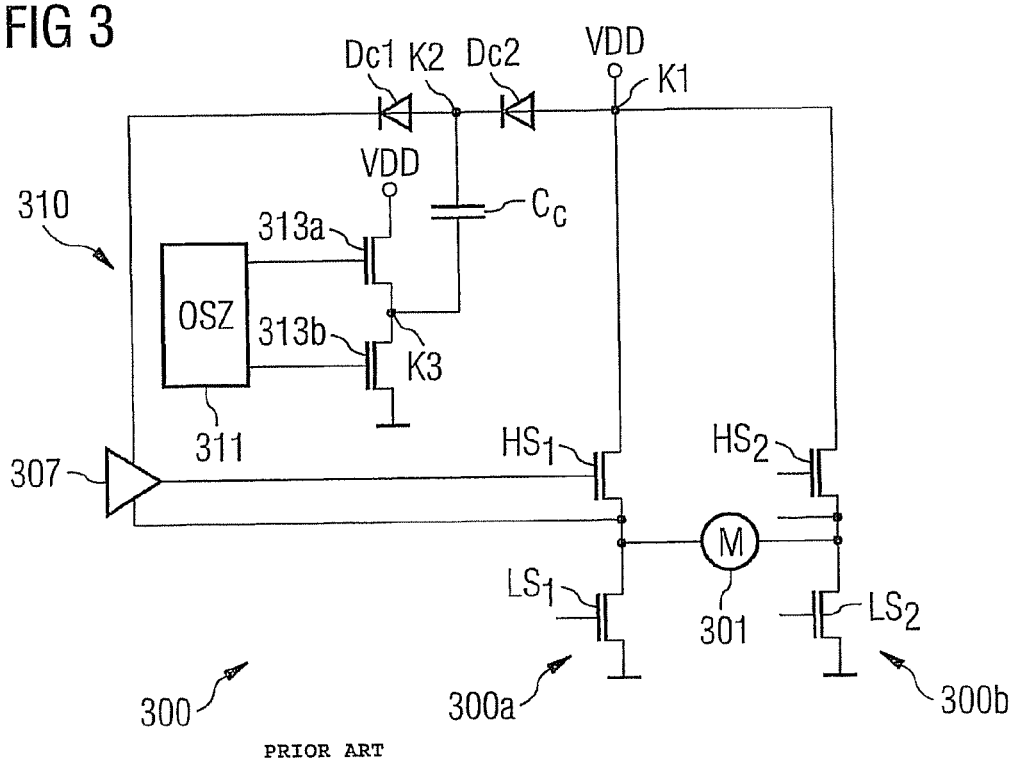
Figure 4:
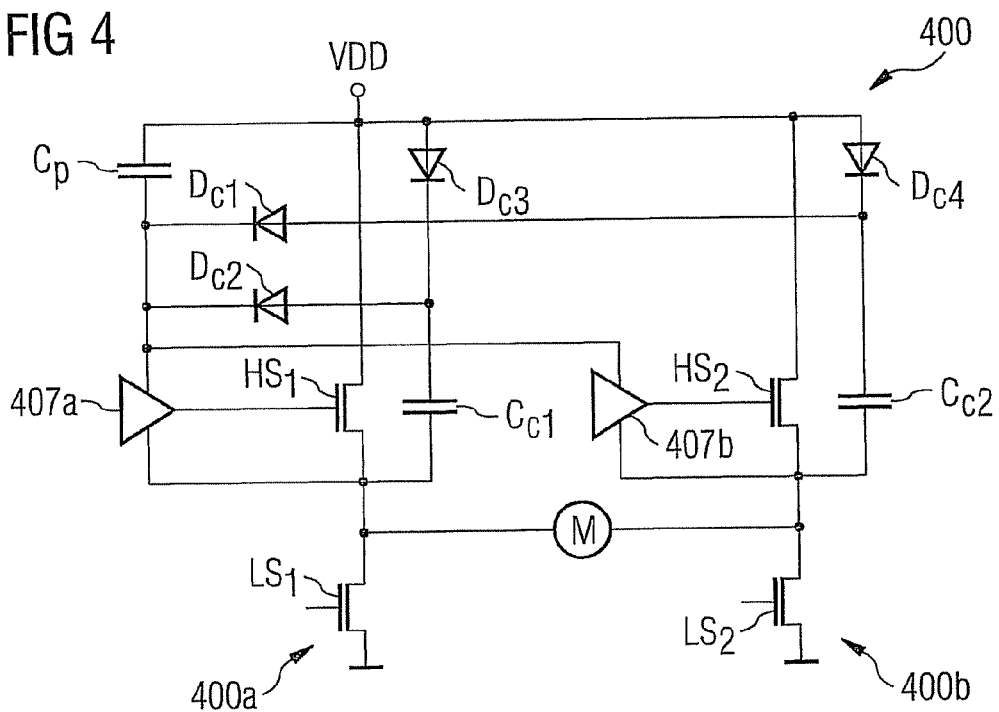

FIG. 4 illustrates, in accordance with the representation in FIGS. 2 and 3, a construction of the bridge driver circuit according one embodiment as an H-bridge driver circuit 400. Its components are designated corresponding to the designations in FIGS. 2 and 3 and are not described again here. An essential difference with respect to the conventional bridge circuit with a separate charge pump (according to FIG. 3) consists in that instead of a single charge pump capacitor, here there are two charge pump capacitors Cc1 and Cc2, each assigned to one of the bridge branches 400*a* and 400*b*, respectively. A diode network having four diodes Dc1 to Dc4 is functionally assigned in this configuration both to the actual bridge circuit section and also to an output stage section of the charge pump driver. In accordance with the same principle, the high-side switch elements HS1 and HS2 of the two bridge branches 400*a*, 400*b* as output stage power components are assigned to the two charge pump capacitors Cc1 and Cc2.

In this embodiment, a separate output stage of a driver circuit of the charge pump is completely eliminated, so that this bridge driver can be produced considerably more economically than a conventional driver.

Figure 5:
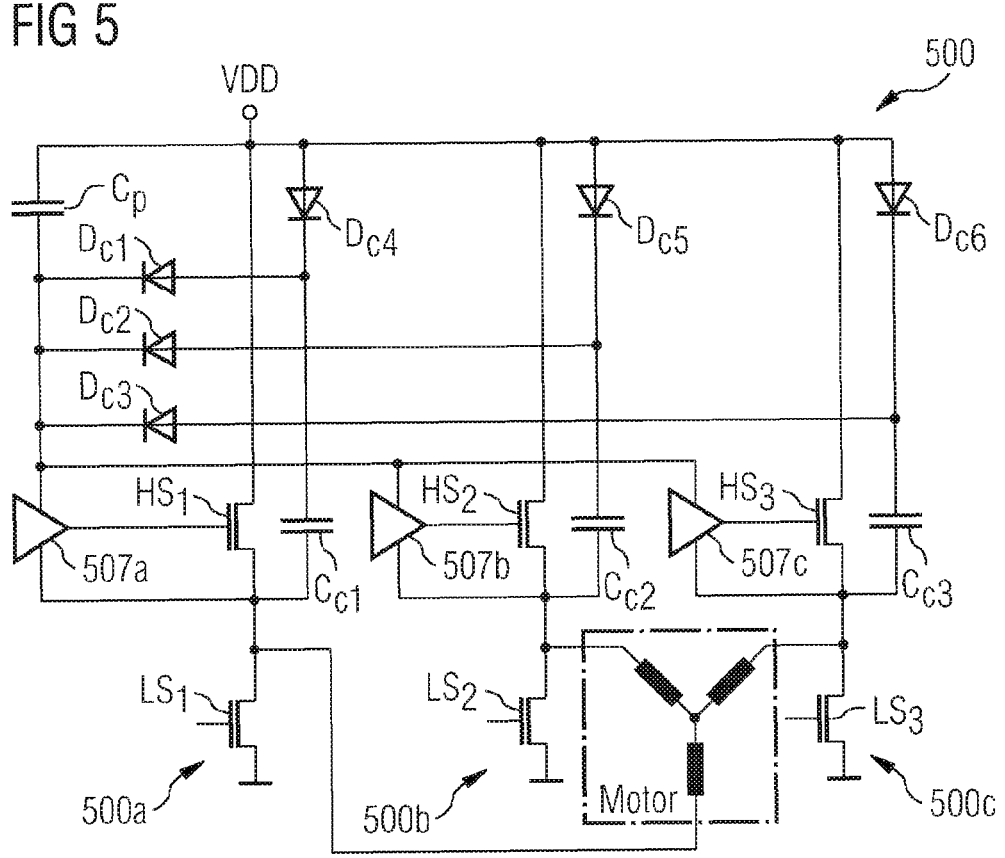

FIG. 5 illustrates, as another embodiment, a three-phase bridge 500 for driving a three current-phase motor 501. Here, the designation of the individual components is also selected in accordance with the preceding figures; in a third bridge branch 500*c* to be added, a low-side transistor LS3 and a high-side transistor HS3, as well as an associated driving circuit 505*c* are also provided to the configuration according to FIG. 3 or 4. Here, the total charge pump capacity is accordingly divided into three charge pump capacitors Cc1, Cc2, and Cc3, each assigned to one of the three bridge branches 500*a*, 500*b*, and 500*c*.

A total of six diodes Dc1 to Dc6 in parallel or series assignment to the appropriate charge pump capacitors Cc1 to Cc3 form bivalent components both of the actual bridge circuit and also of the charge pump driving circuit, as already mentioned in the construction according to FIG. 4 described above. Analogously to this, the high-side switch elements HS1 to HS3 of the bridge branches 500*a* to 500*c* are simultaneously elements of the output stage sections of the charge pump driving circuit.

The construction of the invention is not limited to the examples described here, but instead, is similarly possible in any combination of the features of the dependent claims with each other as well as in other modifications, which lie within the scope of technical activity.

Although specific embodiments have been illustrated and described herein, it will be appreciated by those of ordinary skill in the art that a variety of alternate and/or equivalent implementations may be substituted for the specific embodiments illustrated and described without departing from the scope of the present invention. This application is intended to cover any adaptations or variations of the specific embodiments discussed herein. Therefore, it is intended that this invention be limited only by the claims and the equivalents thereof.

The invention claimed is:

1. A bridge driver circuit with integrated charge pump, comprising:
   a driver circuit section of a charge pump capacitor wherein the driver circuit section is formed with power switch components and a diode network including a plurality of diodes, wherein:
   the diodes of the diode network are simultaneously elements of a bridge circuit section;
   the bridge circuit section includes a first bridge branch having a first bridge diver and a first charge pump capacitor, and a second bridge branch having a second bridge driver and a capacitor, and
   the diode network includes first and second pairs of series connected diodes, each pair connected between a power-supply voltage terminal and the first and second bridge drivers, wherein a first node between the diodes of the first pair of series connected diodes is connected to the first charge pump capacitor, and a second node between the diodes of the second pair of series connected diodes is connected to the second charge pump capacitor.

2. The bridge driver circuit of claim 1, wherein the charge pump capacitor is formed in a distributed arrangement in bridge branches of the bridge circuit section.

3. The bridge driver circuit of claim 1, comprising the configuration as an H-bridge driver circuit with two charge pump capacitors and a power transistor assigned to this as a driving circuit output stage and diodes of the bridge circuit section.

4. The bridge driver circuit of claim 3, configured for controlling a DC motor.

5. The bridge driver circuit of claim 1, comprising the configuration as a three-phase bridge driver circuit with three charge pump capacitors and a power transistor assigned to this as a driving circuit output stage and diodes of the bridge circuit section.

6. The bridge driver circuit of claim 1 configured for controlling a three-phase current motor.

7. The bridge driver circuit of claim 5, comprising the configuration as an integrated circuit.

8. An integrated circuit comprising:
a bridge circuit comprising a first bridge branch and a second bridge branch; and
a charge pump integrated within the bridge circuit such that a first charge pump capacitor is coupled to the first bridge branch and such that a second charge pump capacitor is coupled to the second bridge branch, and further comprising a diode network coupled to each of the first and second bridge branches and to an output stage of the charge pump;
wherein the diode network includes first and second pairs of series connected diodes, each pair connected between a power-supply voltage terminal and the first and second bridge branches, wherein a first node between the diodes of the first pair of series connected diodes is connected to flue first charge pump capacitor and a second node between the diodes of the second pair of series connected diodes is connected to the second charge pump capacitor.

9. The integrated circuit of claim 8, wherein each of the first and second bridge branches comprise power switch components.

10. The integrated circuit of claim 9, wherein the power switch components of each of the first and second bridge branches also comprise a driver circuit section of the charge pump.

11. The integrated circuit of claim 8, configured to drive a DC motor.

12. The integrated circuit of claim 8, further comprising a third bridge branch and a third charge pump capacitor coupled to the third bridge branch.

13. The integrated circuit of claim 12, configured to drive a three-phase motor.

14. The integrated circuit of claim 12, wherein the diode network includes first, second and third pairs of series connected diodes, each pair connected between a power-supply voltage terminal and the first, second and third bridge branches, wherein a first node between the diodes of the first pair of series connected diodes is connected to the first charge pump capacitor, a second node between the diodes of the second pair of series connected diodes is connected to the second charge pump capacitor, and a third node between the diodes of the third pair of series connected diodes is connected to the third charge pump capacitor.

15. A method of operating an integrated circuit comprising:
providing a bridge driver circuit comprising a first bridge branch and a second bridge branch;
providing a charge pump integrated within the bridge driver circuit such that a first charge pump capacitor is coupled to the first bridge branch and such that a second charge pump capacitor is coupled to the second bridge branch;
providing a diode network, functionally assigned both to the bridge driver circuit and to the charge pump; and
simultaneously using components of the first and second bridge branches as components of the bridge driver circuit and the of the charge pump;
wherein the diode network includes first and second pairs of series connected diodes, each pair connected between a power-supply voltage terminal and the first and second bridge branches, wherein a first node between the diodes of the first pair of series connected diodes is connected to the first charge pump capacitor, and a second node between the diodes of the second pair of series connected diodes is connected to the second charge pump capacitor.

16. The method claim 15, wherein the components of the first and second bridge branches are power switch components.

17. A bridge driver circuit with integrated charge pump, comprising: a driver circuit section of a charge pump capacitor wherein the driver circuit section is formed with power-switch components and a diode network including a plurality of diodes, wherein:
the bridge circuit section includes a first bridge branch having a first bridge driver and a first charge pump capacitor, a second bridge branch having a second bridge driver and a second charge pump capacitor, and a third bridge branch having a third bridge driver and a third charge pump capacitor; and
the diode network includes first, second and third pairs of series connected diodes, each pair connected between a power-supply voltage terminal and the first, second and third bridge drivers, wherein a first node between the diodes of the first pair of series connected diodes is connected to the first charge pump capacitor, a second node between the diodes of the second pair of series connected diodes is connected to the second charge pump capacitor, and a third node between the diodes of the third pair of series connected diodes is connected to the third charge pump capacitor.

* * * * *

UNITED STATES PATENT AND TRADEMARK OFFICE
CERTIFICATE OF CORRECTION

| | |
|---|---|
| PATENT NO. | : 7,872,433 B2 |
| APPLICATION NO. | : 11/736301 |
| DATED | : January 18, 2011 |
| INVENTOR(S) | : Nuebling et al. |

It is certified that error appears in the above-identified patent and that said Letters Patent is hereby corrected as shown below:

Column 4, line 44, delete "diver" and insert in place thereof --driver--.

Column 4, line 46, delete "a capacitor" and insert in place thereof --a second charge pump capacitor--.

Signed and Sealed this
Nineteenth Day of April, 2011

David J. Kappos
*Director of the United States Patent and Trademark Office*